No. 876,490.
PATENTED JAN. 14, 1908.
H. F. RASOR.
JOINT.
APPLICATION FILED FEB. 4, 1907.
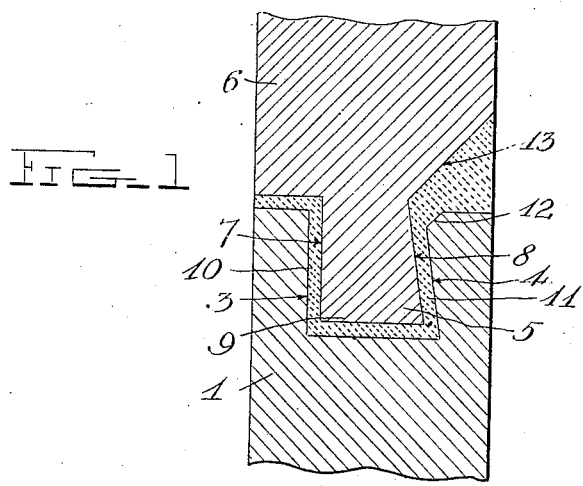
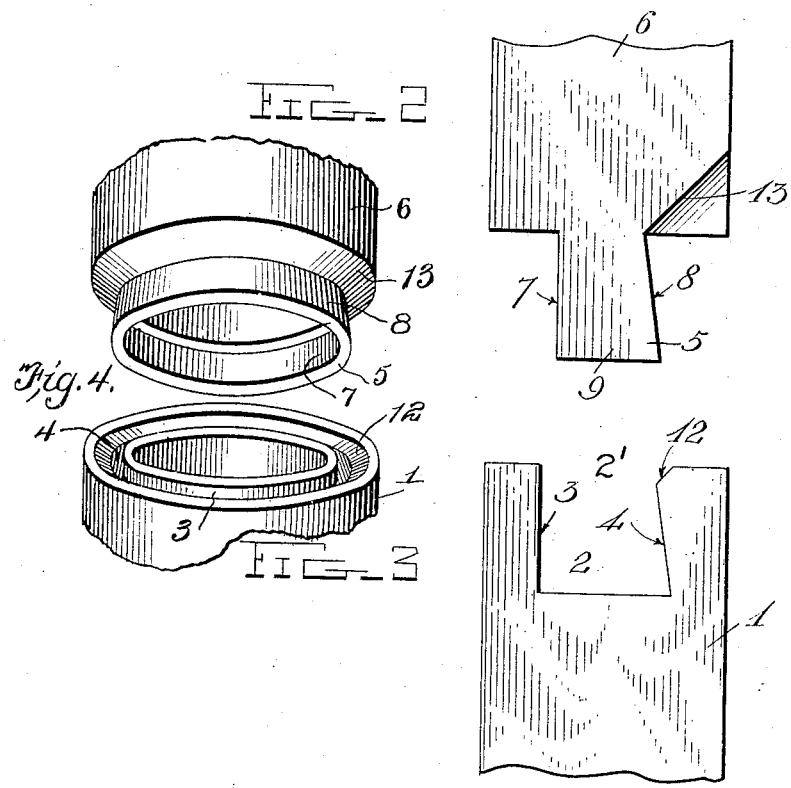
Witnesses
C. H. Griesbauer
Inventor
Harry F. Rasor
by H. B. Willson & Co
Attorneys

UNITED STATES PATENT OFFICE.

HARRY F. RASOR, OF BARBERTON, OHIO.

JOINT.

No. 876,490.  Specification of Letters Patent.  Patented Jan. 14, 1908.

Original application filed February 26, 1906. Serial No. 303,046. Divided and this application filed February 4, 1907. Serial No. 355,672.

*To all whom it may concern*

Be it known that I, HARRY F. RASOR, a citizen of the United States, residing at Barberton, in the county of Summit and State of Ohio, have invented certain new and useful Improvements in Joints; and I do declare the following to be a full, clear, and exact description of the invention, such as will enable others skilled in the art to which it appertains to make and use the same.

This invention relates to an improved joint for connecting the sections or members of a stove or other article.

The object of the invention is to provide a joint for connecting two members by means of which the parts may be placed in position, one over the other and so secured that they cannot be separated and which will be air tight.

This application is a division of my application, Serial No. 303,046, filed Feb. 26, 1906.

In the accompanying drawings, Figure 1 represents a detail sectional view of two members connected by this improved joint; Fig. 2 represents a side elevation of the tongue carrying member detached; Fig. 3 represents a similar view of the grooved member and; Fig. 4 is a perspective view of the adjacent ends of two sections in position for assembling.

In the embodiment illustrated, the lower section or member 1 has formed in its upper edge a substantially dove-tailed groove 2, the inner wall 3 of which is made vertical and the outer wall 4 is undercut. The upper member or section 6 has formed upon its lower edge a rib or tongue 5 of a shape to correspond with the shape of the groove 2, in cross section the inner face 7 of said tongue being straight and adjacent to the straight wall 3 of the groove 2 and the outer wall 8 being inclined or beveled to correspond with the undercut wall 4 of said groove. The lowermost or broadest portion 9 of the tongue 5 is slightly less than the upper narrowest portion 2' of the groove 2, so that said rib or tongue 5 may be readily inserted in the groove through the top thereof without necessitating the sliding endwise movement necessary in the ordinary dove-tailed joint. This construction of the tongue and groove leaves a space 10 between the faces of said members when assembled which is adapted to be filled with cement or other binding material 11, as clearly shown in Fig. 1. To facilitate the insertion of the cement, the outer portions of the meeting edges of the two members or sections are preferably beveled slightly as shown at 12 and 13.

This invention is peculiarly adapted for use in furnaces, etc., in which it is necessary to provide an air tight joint and also to permit of the parts benig assembled by a longitudinal movement of the sections with little or no lateral movement. By constructing the sections as above described, the wall of the outer edge of the groove at the top is cut away or beveled entirely around the section, and the lower end of the upper section is tapered inward or chamfered on its outer wall, entirely around the section, and the rib or projection is enlarged or expanded toward its lower end. As the rib is of less area in cross section than the groove, when the parts are assembled a receptacle is formed all around the two sections with the mouth or opening thereinto above the remaining portions at all points which causes the groove to be completely filled when the cement is introduced through said flared opening or mouth and, after the cement has set it prevents the separation of the sections owing to the enlarged end of the rib and the overhanging wall of the groove.

When the sections are placed one on the other with the tongue of one engaging the groove of the other, the cement is inserted in the space 10 in a soft flowing condition through the opening or mouth formed by the inclined walls 12 and 13 and it flows down around the tongue 5, filling the space 10 and when it hardens, it unites with the tongue and forms a complete dove-tailed connection which securely holds the parts together while at the same time forming an air tight joint.

I claim as my invention:

1. Two sections adapted to be joined together, one of which is provided with a groove, and the other with a rib, one wall of the groove being undercut towards the bottom and beveled at its upper edge and the rib being expanded toward its lower end and the wall of its section being beveled above said rib, said sections being at a distance apart for the reception of cement when the rib is inserted in said groove.

2. Two hollow furnace sections adapted to be secured together in alinement, the upper edge of the lower section being provided with a groove entirely around it, angular in cross section, the outer wall of the groove being undercut toward the bottom and having its upper edge cut away on a bevel, and the lower end of the upper section being provided with an annular rib, of less area in cross section than the groove, and expanded toward its lower end, and adapted to fit in said groove, the lower end of the upper section being tapered on its outer wall entirely around the same, whereby a mouth or entrance is formed to the space between the rib and the walls of the groove, said mouth being higher than said space, and cement within said mouth and space.

In testimony whereof I have hereunto set my hand in presence of two subscribing witnesses.

HARRY F. RASOR.

Witnesses:
HARRY S. DAVIDSON,
ANNA BERNARD.